Patented July 30, 1929.

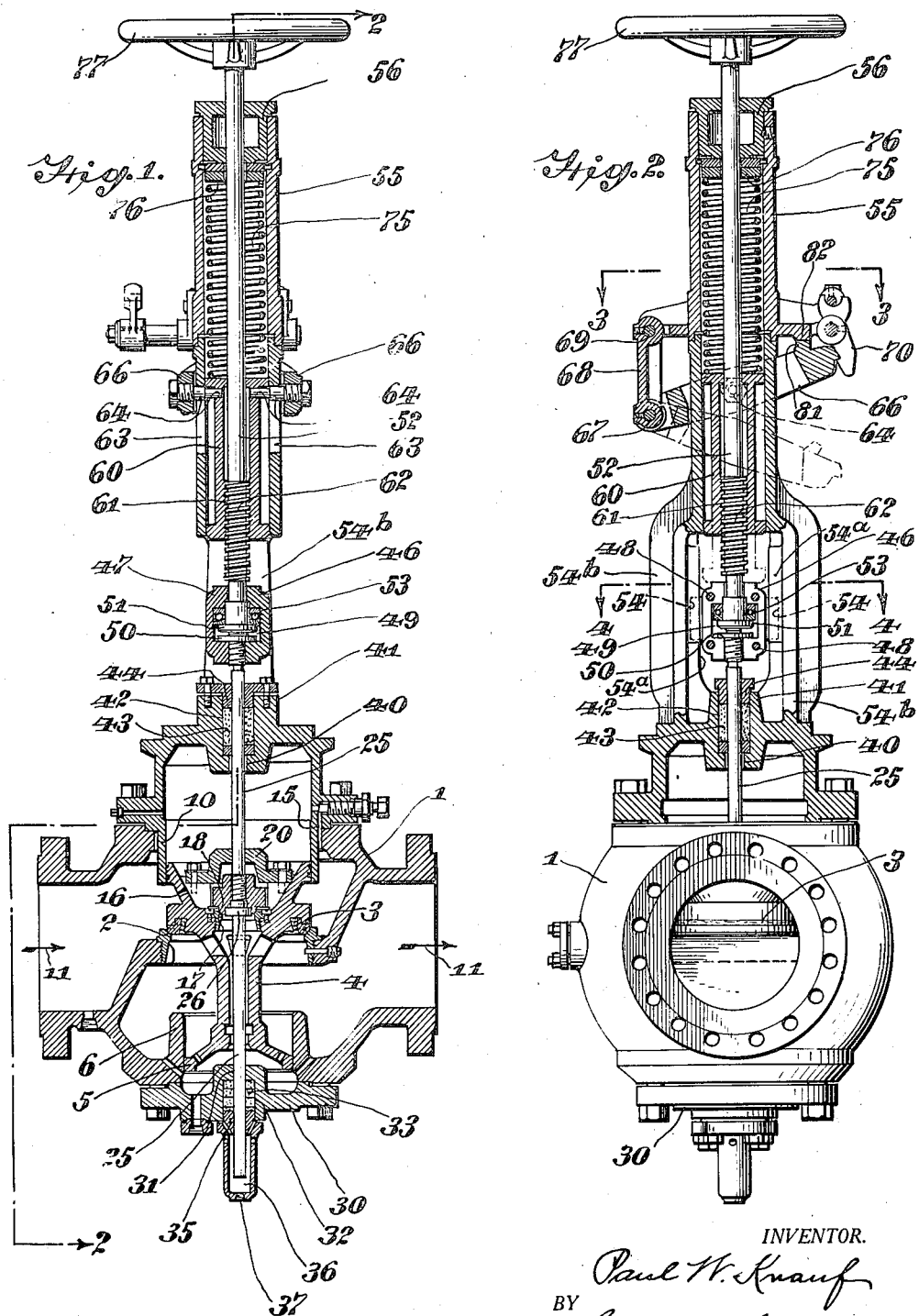

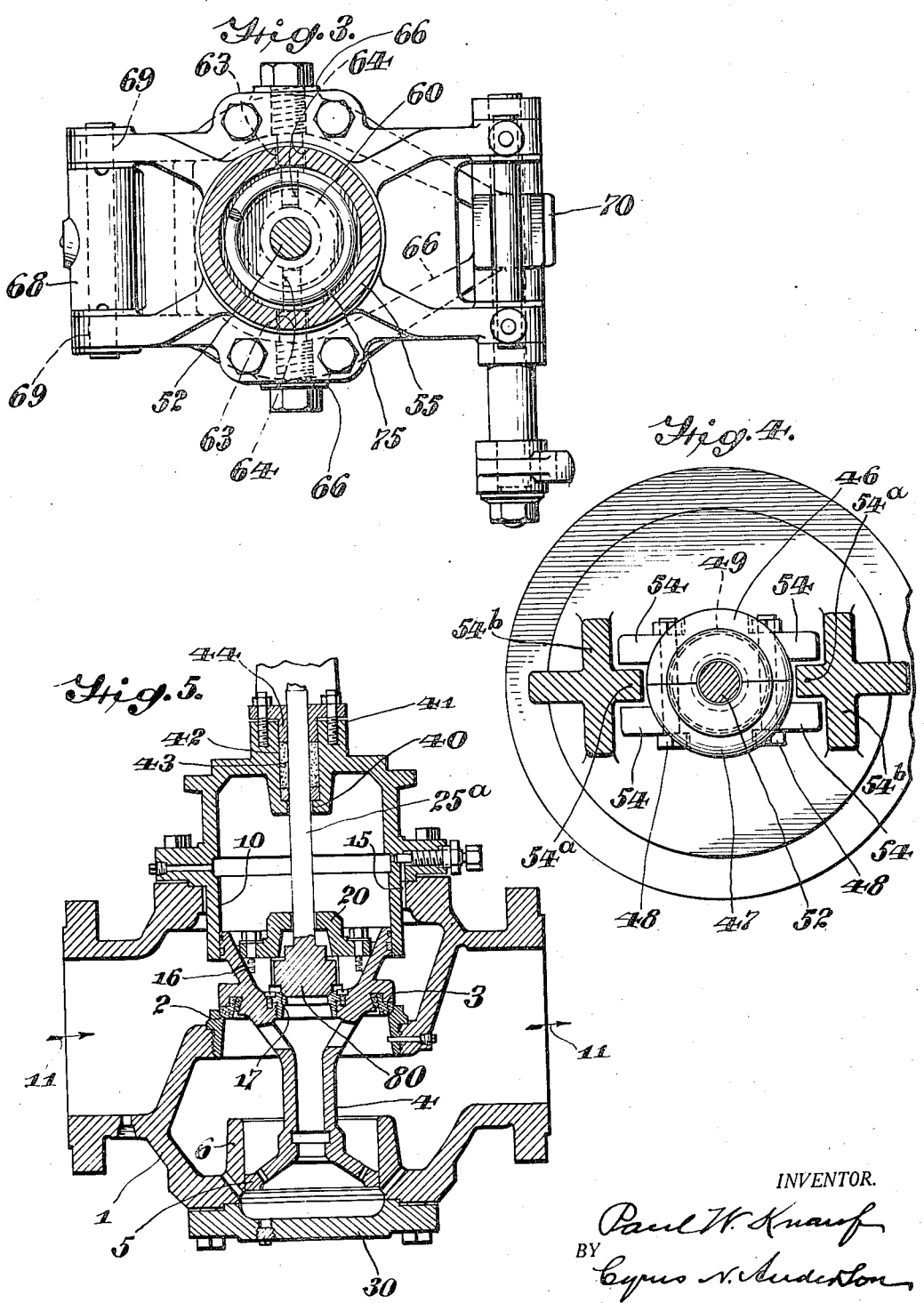

1,722,754

UNITED STATES PATENT OFFICE.

PAUL W. KNAUF, OF CYNWYD, PENNSYLVANIA, ASSIGNOR TO SCHUTTE AND KOERTING COMPANY, OF PHILADELPHIA, PENNSYLVANIA, A CORPORATION OF PENNSYLVANIA.

TRIP-VALVE STRUCTURE.

Application filed November 23, 1926. Serial No. 150,169.

My invention relates to trip valve structures for use in connection with turbine and other engines.

The general object of the invention is to provide a novel construction of means for facilitating the closing action of the valve element of such a valve structure in case the tripping mechanism is released.

It also is an object of the invention to provide a trip valve structure in which the valve stem or shaft consists of two parts coupled together and relatively rotatable, one of the said parts extending through the valve casing and being connected with the valve therein, while the other of said parts is located outside of the said valve casing and is of greater diameter than the first named portion which extends through the said valve casing.

Another object of the invention is to provide a trip valve structure comprising a valve stem consisting of two parts relatively rotatable, one of which is located outside of the valve casing and the other one of which extends through the valve casing, its outer end being exposed to the atmosphere, the first named member or part being of greater diameter than the second named member or part.

In order that the invention may be readily understood and its advantages and objects fully appreciated reference should be had to the accompanying drawings in which I have illustrated certain forms of embodiment thereof. However, it will be understood that the invention is susceptible of embodiment in other forms of construction than those shown and that changes in the details of construction may be made within the scope of the claims without departing from the said invention.

In the drawings:

Fig. 1 is a view in central longitudinal section of a trip valve structure embodying the invention;

Fig. 2 is a view taken in a plane substantially at right angles to that in which Fig. 1 is taken, said view being partly in section and partly in elevation;

Fig. 3 is a transverse sectional view taken on the line 3—3 of Fig. 2;

Fig. 4 is a transverse sectional view taken on the line 4—4 of Fig. 2; and

Fig. 5 is a view in section of a fragmentary portion of the structure taken in the same plane as that in which Fig. 1 is taken but showing a modified construction embodying the invention.

In the drawings, 1 designates a valve casing of known construction provided with a valve seat 2 interiorly thereof with which a valve 3 is adapted to cooperate. The valve is provided with a spool 4 provided upon its outer end with an enlargement 5 which operates in the guiding inwardly extending tubular portion 6.

The upper portion of the spool upon which the valve 3 is mounted is flared outwardly and projects into a cylinder 10. The valve spool and the valve are guided in their reciprocating movements by the cylinders 6 and 10, all in known manner. The steam flows through the valve casing and through the valve opening therein in the direction of the arrows 11. The front or left hand portion of the valve chamber is in communication, as usual, with the interior of the cylinder 10 through openings 15 and 16. The upwardly flared inverted truncated shaped portion of the spool upon which the valve 3 is mounted is provided upon its inner side with a valve seat 17 with which a relatively movable pilot valve 18 cooperates. The pilot valve 18 is limited in its movements away from the valve seat 17 by means of a yoke 20 secured to the outwardly flared portion of the spool previously referred to. The yoke 20, as well as the spool 4 and also the pilot valve 18 are provided with alined openings extended therethrough. Through the said openings the section or part 25 of a valve actuating rod extends. The said rod has screw threaded connection with the opening through the pilot valve 18 and is provided with a nut or sleeve 26 which engages the adjoining portion of said pilot valve on the same side as that which cooperates with the valve seat 17 previously referred to.

The lower side of the valve casing 1 is provided with an opening in alinement with the cylinder 6 previously referred to, which opening is closed by means of a cap or cover 30. The part 25 previously referred to extends through an opening 31 in the said cover and through an enlarged recess or chamber 32 within which is located packing 33 which surrounds the said part to prevent the escape of steam through the opening 31. A drip cup gland 35 is provided for closing the said recess. The lower end of the said gland is extended and is provided with an opening or chamber 36 which communicates with the atmosphere through an opening 37. The gland 35 is adjustable to effect compression of the packing 33 previously referred to. The outer end of the part or section 25 of the valve rod or shaft projects into the chamber 36.

The upper portion of the part 25 extends through an opening 40 in the upper closed end of the said cylinder 10 previously referred to. The upper closed end of the said cylinder is provided with a projection or boss 41 having a recess or chamber 42 therein filled with suitable packing material 43 which surrounds the portion of the part 25 which extends therethrough. The packing 43 may be compressed by means of a gland 44. The upper end of the part 25 has connection with the lower end of a coupling consisting of two complemental members 46 and 47 secured together by means of bolts 48. These coupling members are provided with recesses which cooperate to form a recess 49 in the lower end of which is mounted a washer 50 constituting a thrust bearing for the head 51 upon the lower end of a member 52 in alinement with the part 25 and constituting with the latter means for actuating the main and pilot valves to which reference has been made previously. A ball thrust bearing 53 is interposed between the upper side of the head 51 and the opposing upper end of the recess 49. The coupling is provided with laterally extending projections 54 which are spaced from each other and arranged in pairs. The projections of each pair are located upon opposite sides of stationary guides 54ª provided upon the inner sides of the frame structure 54ᵇ whereby the said coupling is guided in its reciprocatory movements and held against rotation.

The member 52 extends outwardly through a tubular member 55 connected with the frame structure 54ᵇ, the upper end of which is closed by means of a plug 56 secured therein. A tubular member 60, preferably of spool shape, is located in the lower end portion of the tubular member 55. The member 60 is provided with internal screw threads 61 which are in engagement with external screw threads 62 upon an intermediate portion of the part 52 previously referred to. The tubular member 55 is provided with oppositely disposed slots 63 through which the inner end portions of pins 64 extend, which pins are projected into openings in the member 60 and are thereby connected therewith. The said pins are carried upon the intermediate portions of the oppositely disposed arms of a double-armed lever 66 pivotally supported at one end, as indicated at 67, upon the lower end of a link 68 pivoted at its upper or outer end to a stationary pivot 69 mounted or supported upon the tubular member 55. The double-armed lever 66 swings about its pivot at 67 and its opposite swinging end is adapted to be held in elevated position, as shown in full lines in Fig. 2, by means of a catch or trigger 70, in known manner. The said catch or trigger is adapted to be tripped by any suitable known means.

A coiled spring 75 is located in the tubular member 55 with its lower end resting upon the upper end of the member 60 while its upper end bears against the inner side of the innermost of two washers 76, the outer of which is seated against the inner end of the plug 56. The spring 75 is under compression, in consequence of which it tends to cause downward or inward movement of the member 60 and of the double-armed lever 66 previously referred to. When, however, the swinging end of the said lever is held by the catch or trigger 70 such inward movement of the member 60 and of the said lever 66 is prevented. It will be noted that as a result of the coupling connection between the parts 52 and 25 the former may be rotated without causing rotation of the latter. It also will be noted that rotation of the part 52 of the valve actuating rod or shaft for opening the valve when under pressure is facilitated by the presence of the antifriction roller bearing 53. Rotation of the member 52 may be effected by any suitable means but in the construction shown I have provided a hand wheel 77 for that purpose.

The construction as shown in Fig. 5 is identical with that of the corresponding portion shown in Figs. 1 and 2, except that the part or section 25ª of the valve actuating rod does not extend entirely through the valve casing 1, in consequence of which the cover 30 is not provided with a central opening corresponding to the central opening therein shown in Fig. 1. In said Fig. 5 the lower end of the section 25ª of the valve actuating rod terminates in a head 80 which is located between the yoke 20 and the valve seat 17. The said head 80 constitutes a pilot valve.

The purpose and function of the pilot valve is well known and need not be described specifically or in detail herein.

The parts or sections 25 and 25ª being coupled to the part 52 in the manner as previously set forth, it follows that in order to effect upward movement of the double-armed lever 66, the pilot valve 18 or 80, and the spool 4 carrying the valve 3, it is necessary that only the portion 52 be rotated.

Assuming that the pilot and main valves are in closed position as shown in the drawings and that the double-armed lever 66 occupies the position shown in dash and dot lines in Fig. 2 with the member 60 in corresponding lowered position, the said member 60 may be adjusted upwardly to effect upward or outward swinging movement of the lever 66 by rotation of the member 52 of the valve actuating rod toward the right. When the lever 66 has reached its outermost position it is engaged automatically by the catch or trigger 70 and its further outward movement is limited by the contact of a projection 81 thereon with a stationary contact 82. The said lever having thus reached its limit of outward movement the part 52 is locked against further rotation in the direction in which it had been rotated previously. Thereafter, in order to effect opening movement of the pilot and main valves, the first named valve being first opened for reasons well known in the art, the part 52 is then rotated in a reverse direction as a result of which the said part is moved outwardly or away from the valve. By reason of the coupled connection between the parts 52 and 25 (or 25ª as the case may be) the said part 25 or 25ª likewise is moved outwardly to effect opening movement of the pilot and main valves. By reason of the fact that in order to actuate the pilot and main valves it is necessary only that the part 52 be rotated, the part 25 or 25ª, as the case may be, may be of substantially less diameter than the said part 52. In other words, because the part 25 or 25ª is not subjected to a twisting or torsion force it is not necessary that it be of relatively great strength as compared with that of the portion 52 which is subjected to such twisting or torsion force. By reason of the fact that in the construction as shown in Figs. 1 and 2 the member 25 extends entirely through the valve casing 1 so that both ends thereof are exposed to the atmosphere, it follows that the steam pressure within the said casing has no effect thereon tending to move the same in either direction or to hold the same against movement. As a result of that arrangement it will be seen that there is no force present tending to hold the valve in open position after movement of the catch or trigger 70 to release the swinging end of the lever 66. It follows, therefore, that upon the tripping of the said lever the valve moves quickly and surely into closed position. But for the presence of friction between the relatively movable parts of the valve structure the spring 75 would not be necessary, but to insure closing action in all cases and at all times when the catch or trigger 70 is released the presence of said spring is desirable. However, the said spring may be of relatively light construction thereby affording a more economical construction than heretofore has been practicable.

In Fig. 5, in which the part 25ª does not extend through the valve casing and in which both ends thereof are not exposed to the atmosphere outside of the said casing, the steam within the said casing does exert pressure tending to prevent closing of the valve upon release of the catch or trigger 70. However, in view of the fact that the diameter of the part 25ª is greatly reduced, by reason of the coupling connection between the said part and the part 52 as previously described, the pressure of the steam tending to cause outward or opening movement of the valves is relatively small as compared with what would be the case if the diameter of the part 25ª were the same as that of the part 52. The smaller the diameter of the part 25ª the less the pressure exerted thereon by the steam tending to prevent closing movement of the valve upon tripping of the catch or trigger 70.

It will be seen that by my invention I have provided means whereby the closing of the valve upon release of the catch or trigger 70 is facilitated and whereby economy in construction is obtained.

Having thus described my invention, what I claim and desire to secure by Letters Patent is:

1. A trip valve structure, comprising in combination a valve casing having a passageway therethrough through which a vapor under pressure is adapted to flow, a valve located within the said casing for opening and closing the said passageway, a valve actuating rod consisting of two parts, one of which parts extends through the said valve casing transversely of the fluid passageway therethrough, the opposite ends of which part are of equal diameters and are exposed to the atmosphere whereby the said part is balanced, means for rotatably connecting the other of said parts to the part which extends through the said valve casing, and means for effecting rotation of the said other part.

2. A trip valve structure, comprising in combination a valve casing having a passageway therethrough through which a vapor under pressure is adapted to flow, a valve mounted within the said valve casing for opening and closing the said passageway to control the flow of fluid therethrough, a rod extending through the said valve casing transversely of the said passageway and having connection with the said valve, the opposite ends of which rod are of equal diameters and are exposed to the atmosphere whereby the said rod is balanced, a rod supported exteriorly of the said valve casing in alinement with the first named rod, and coupling means for rotatably connecting the second named rod with the adjoining end of the first named rod.

3. A trip valve structure, comprising in combination a valve casing having a passageway therethrough through which a vapor under pressure is adapted to flow, a valve mounted within said casing for opening and closing the said passageway, a rod extending through the said valve casing transversely of the said passageway, the opposite ends of which are exposed to the atmosphere, a rod located exteriorly of the said valve casing in alinement with the first named rod, the said second named rod being of greater diameter than the first named rod, means for rotatably coupling the second named rod to the first named rod, a tubular member through which the second named rod extends, a tubular element mounted within the said tubular member and having screw threaded connection with the said second named rod, and yielding means located within the said tubular member and tending to cause movement of the said tubular element toward the said valve casing, substantially as described.

4. A valve structure comprising in combination a valve casing having a passageway therethrough, a valve mounted in said casing for opening and closing said passageway, a rod extending through the said valve casing transversely of the said passageway the opposite ends of which project from the said casing and are of equal diameters, a rod located exteriorly of the said valve casing in alinement with the first named rod, the second named rod being of greater diameter than the first named rod, and means for rotatably coupling the second named rod to the first named rod.

In testimony that I claim the foregoing as my invention, I have hereunto signed my name this 17th day of November, A. D. 1926.

PAUL W. KNAUF.